(12) United States Patent
Pugh et al.

(10) Patent No.: US 7,506,748 B2
(45) Date of Patent: Mar. 24, 2009

(54) APPARATUS FOR SEPARATING AND CONVEYING ARTICLES

(75) Inventors: Roger D. Pugh, Fort Smith, AR (US); Gary Ray Lauwers, Huntington, AR (US); Michael David Reano, Huntington, AR (US)

(73) Assignee: L&W Equipment, Inc., Poteau, OK (US)

( * ) Notice: Subject to any disclaimer, the term of this patent is extended or adjusted under 35 U.S.C. 154(b) by 246 days.

(21) Appl. No.: 11/593,814

(22) Filed: Nov. 7, 2006

(65) Prior Publication Data

US 2008/0105514 A1 May 8, 2008

(51) Int. Cl.
*B07C 3/04* (2006.01)

(52) U.S. Cl. .................. 198/529; 198/443; 198/396; 198/397.03; 452/179; 452/183

(58) Field of Classification Search ............. 198/529, 198/443, 528, 526, 527, 563, 565, 566, 396, 198/397.03, 397.01, 450; 452/179–184
See application file for complete search history.

(56) References Cited

U.S. PATENT DOCUMENTS

| | | | |
|---|---|---|---|
| 2,454,285 A | 11/1948 | Krueger | |
| 2,672,647 A * | 3/1954 | Haber | 452/179 |
| 2,941,651 A | 6/1960 | Hutter | |
| 3,049,215 A | 8/1962 | Hutter | |
| 3,054,497 A | 9/1962 | Davis et al. | |
| 3,224,554 A | 12/1965 | Moulder et al. | |
| 3,471,000 A | 10/1969 | Bodolay | |
| 3,561,041 A | 2/1971 | Szymanski | |
| 3,614,924 A * | 10/1971 | Hickey | 99/404 |
| 3,696,925 A * | 10/1972 | Harper | 209/688 |
| 3,713,527 A * | 1/1973 | Ginther | 198/389 |
| 3,717,236 A | 2/1973 | New | |
| 3,815,782 A | 6/1974 | Miller | |
| 3,830,357 A * | 8/1974 | West et al. | 198/527 |
| 3,837,469 A * | 9/1974 | Kihnke | 198/382 |

(Continued)

FOREIGN PATENT DOCUMENTS

JP       59128114 A  *  7/1984  ............ 198/397.01

OTHER PUBLICATIONS

Scanvaegt International A/S, ScanFeeder 7700 Product Feeding Equipment, Brochure, Date unknown, 4 pp.

(Continued)

*Primary Examiner*—Mark A Deuble
(74) *Attorney, Agent, or Firm*—Gardere Wynne Sewell, LLP

(57) ABSTRACT

Apparatus for transferring pliant articles, such as poultry carcasses or parts thereof, includes a first separator stage comprising a slide plate with spaced apart sets of guides for receiving articles and for conveying the articles toward a second separator stage. The second separator stage comprises a rotary drum with spaced apart hook-like tines which engage articles received from the slide plate for rotation to a position whereby the force of gravity allows the articles to be released from the drum to fall into respective compartments of a third separator stage. The third separator stage includes spaced apart moveable closures which are operated in timed relationship to each other to release the articles onto a conveyor or other apparatus to provide spacing and alignment of the articles generally in single file.

18 Claims, 4 Drawing Sheets

U.S. PATENT DOCUMENTS

| | | | |
|---|---|---|---|
| 4,094,412 A | 6/1978 | Hoppmann et al. | |
| 4,171,045 A | 10/1979 | Lapeyre | |
| 4,207,986 A | 6/1980 | Cerroni | 209/616 |
| 4,279,336 A | 7/1981 | Henderson et al. | |
| 4,369,875 A | 1/1983 | Schmitz | |
| 4,401,203 A | 8/1983 | McDonald et al. | |
| 4,526,269 A | 7/1985 | Henderson et al. | |
| 4,578,001 A | 3/1986 | Ochs et al. | |
| 4,610,345 A * | 9/1986 | Spreen et al. | 198/392 |
| 4,705,156 A | 11/1987 | Boling | |
| 4,771,877 A | 9/1988 | Langen | |
| 4,830,172 A | 5/1989 | Hilton et al. | |
| 4,934,510 A | 6/1990 | Lutgendorf | |
| 4,938,082 A | 7/1990 | Buckley et al. | |
| 4,962,842 A | 10/1990 | Limoni | |
| 5,044,487 A | 9/1991 | Spatafora et al. | |
| 5,234,098 A | 8/1993 | Pedersen | |
| 5,343,886 A | 9/1994 | Beswick | |
| 5,355,992 A | 10/1994 | Baig et al. | |
| 5,372,236 A | 12/1994 | Layer | |
| 5,474,493 A | 12/1995 | Tolbert | |
| 5,575,712 A * | 11/1996 | Krewer | 452/177 |
| 5,740,899 A | 4/1998 | Pugh et al. | |
| 2005/0189274 A1 | 9/2005 | Nielsen | |
| 2006/0037838 A1 | 2/2006 | Pugh | |

OTHER PUBLICATIONS

International Search Report for Co-Pending PCT Application No. PCT/US2007/083621 Issued Sep. 26, 2008.

Written Opinion for Co-Pending PCT Application No. PCT/US2007/083621 Issued Sep. 26, 2008.

* cited by examiner

APPARATUS FOR SEPARATING AND CONVEYING ARTICLES

BACKGROUND OF THE INVENTION

In many article handling and conveying operations, it is necessary to sort or separate the articles for conveying in a single file or seriatim along a conveyor, or placed on a conveyor seriatim. Certain improvements in apparatus for conveying articles single file are the subject of copending patent application publication no. U.S. 2006/0037838A1, as well as U.S. Pat. Nos. 5,474,493 and 5,740,899, the subject matter of all of which is incorporated herein by reference.

The apparatus of the foregoing patents and patent application publication are advantageous for many article separating and singulating applications. However, in certain product or article processing operations, the product may be a somewhat pliable, lumpy mass of soft texture, such as poultry carcasses or parts thereof. Such products are often somewhat difficult to separate from each other and to be spaced apart single file on a conveyor or on further processing equipment. The soft, somewhat sticky and pliable mass of such articles has, heretofore, rendered somewhat inefficient prior art article separating and processing equipment. However, the present invention overcomes problems associated with prior art apparatus, as will be appreciated from reading the summary and detailed description which follows.

SUMMARY OF THE INVENTION

The present invention provides an apparatus for separating and placing articles, preferably spaced apart, in a single file or seriatim on a conveyor or for treatment by other processing equipment or in connection with certain process steps. In particular, the apparatus of the present invention is advantageous for processing and separating articles of somewhat pliable mass and texture, such as poultry carcasses, for example, and/or parts thereof.

In accordance with one important aspect of the present invention, an apparatus is provided which has multiple stages of separation of products or articles to facilitate placing such articles in a single file or seriatim for conveyance by a conveyor associated with the apparatus or other equipment which is adapted to receive the articles in a single file or row or spaced apart one after another along a line.

In accordance with a further aspect of the present invention, a pliable mass type article separation and singulation apparatus is provided which includes a first separation stage comprising a gravity slide plate for feeding articles somewhat separated and single filed toward a second stage of separation which transfers the articles to a third stage and which third stage may be operable through a timing mechanism to place the articles on a conveyor or on a further piece of equipment in a single file or spaced apart side-by-side, one after another. The first stage of separation includes a gravity powered surface or plate which is set at an acute angle to the horizontal and is provided with adjustable guide rails or guide plates which provide respective side by side channels which provide separation and feeding of the articles toward a second stage separator.

The second stage separator is preferably a rotary drum having spaced apart sets of product engaging members, such as tines or hooks projecting radially from the drum and spaced apart sufficiently to engage articles received from the channels of the gravity feed and separation plate. A third stage separating mechanism or unit is characterized by a container having spaced apart article receiving compartments aligned with the sets of tines or hooks and including a series of side-by-side gates or doors which are operated in timed relation to release the separated product units or articles from the respective compartments onto a conveyor or additional piece of equipment which will support the articles in a single file or in alignment with each other generally along a line and, preferably, spaced apart predetermined distances from each other.

Accordingly, the apparatus of the invention relies on gravity for a major portion of the separation and transfer operations and at least partially through all three stages of separation and singulation. The apparatus is adapted to be constructed of conventional materials used for food processing equipment, is easily maintained and cleaned and having a minimum of motor operated components.

Those skilled in the art will further appreciate the above-mentioned advantages and superior features of the invention, together with other important aspects thereof upon reading the detailed description which follows in conjunction with the drawings.

DETAILED DESCRIPTION OF A PREFERRED EMBODIMENT

Figure 1:
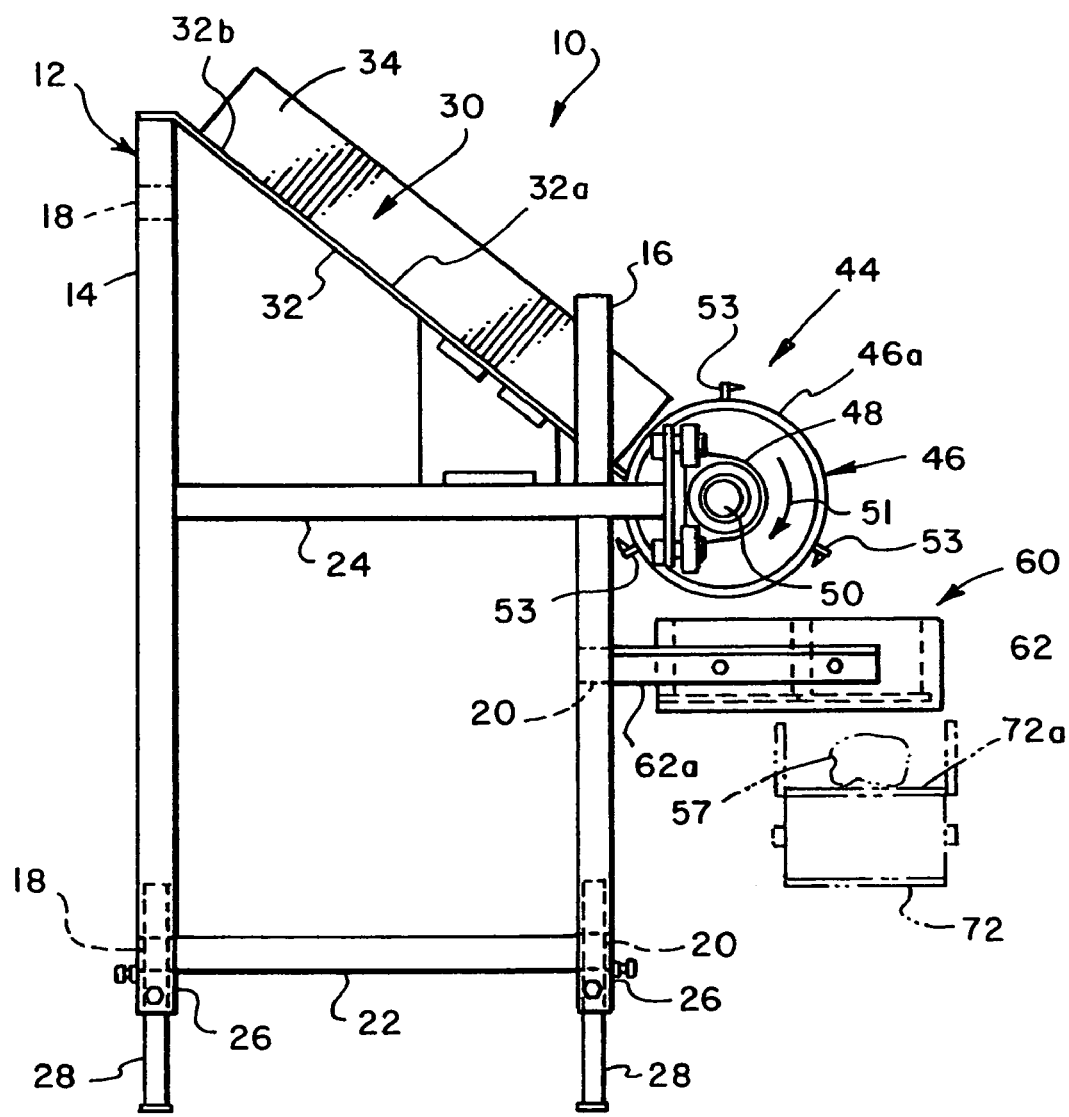
FIG. 1 is a side elevation of an apparatus in accordance with the present invention.

In the description which follows like parts are marked throughout the specification and drawings with the same reference numerals, respectively. The drawings may not be to scale and certain features may be shown exaggerated in scale or in somewhat schematic form in the interest of clarity and conciseness.

Figure 2:
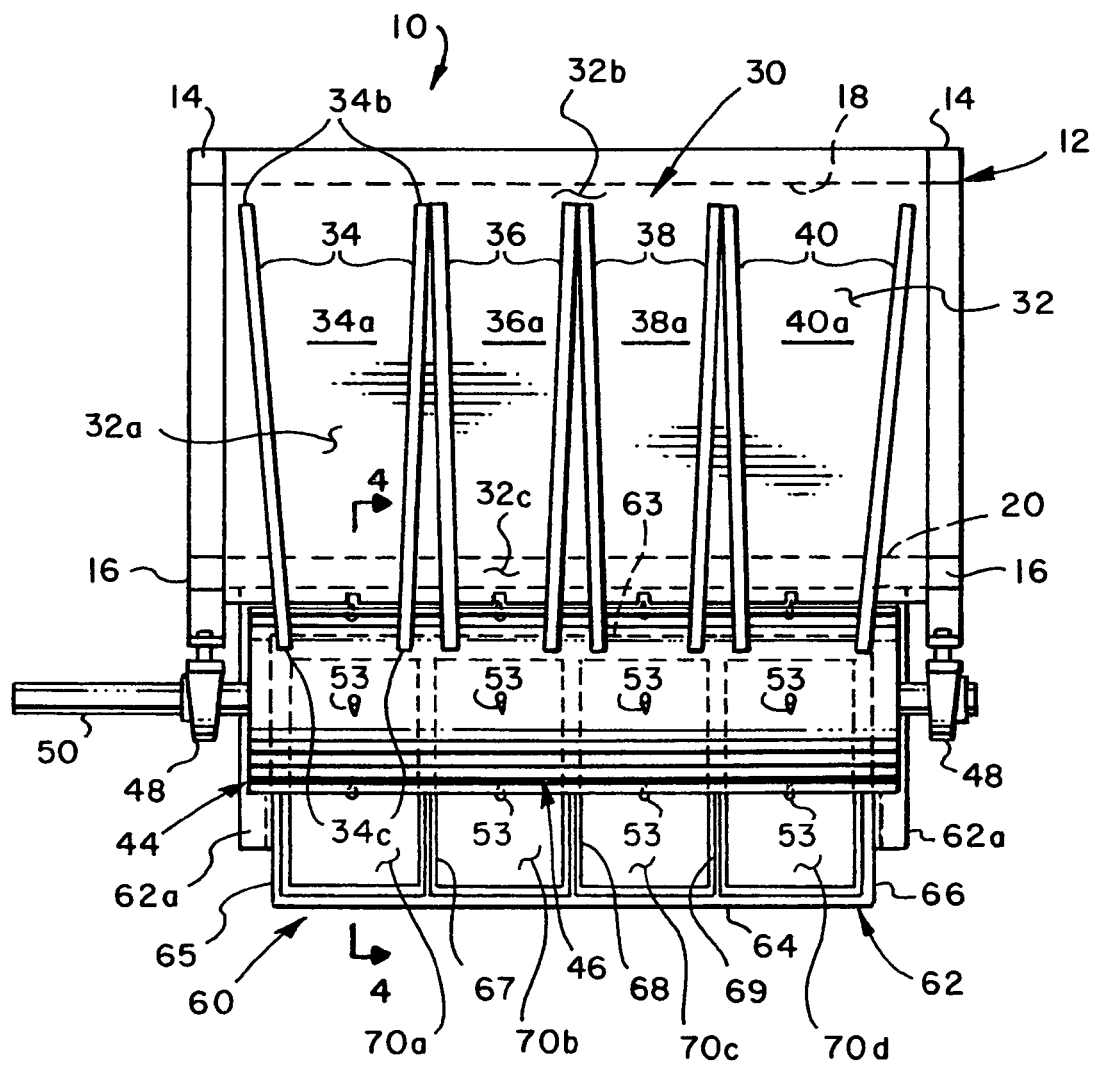
FIG. 2 is a top plan view of the apparatus shown in FIG. 1.
Figure 3:
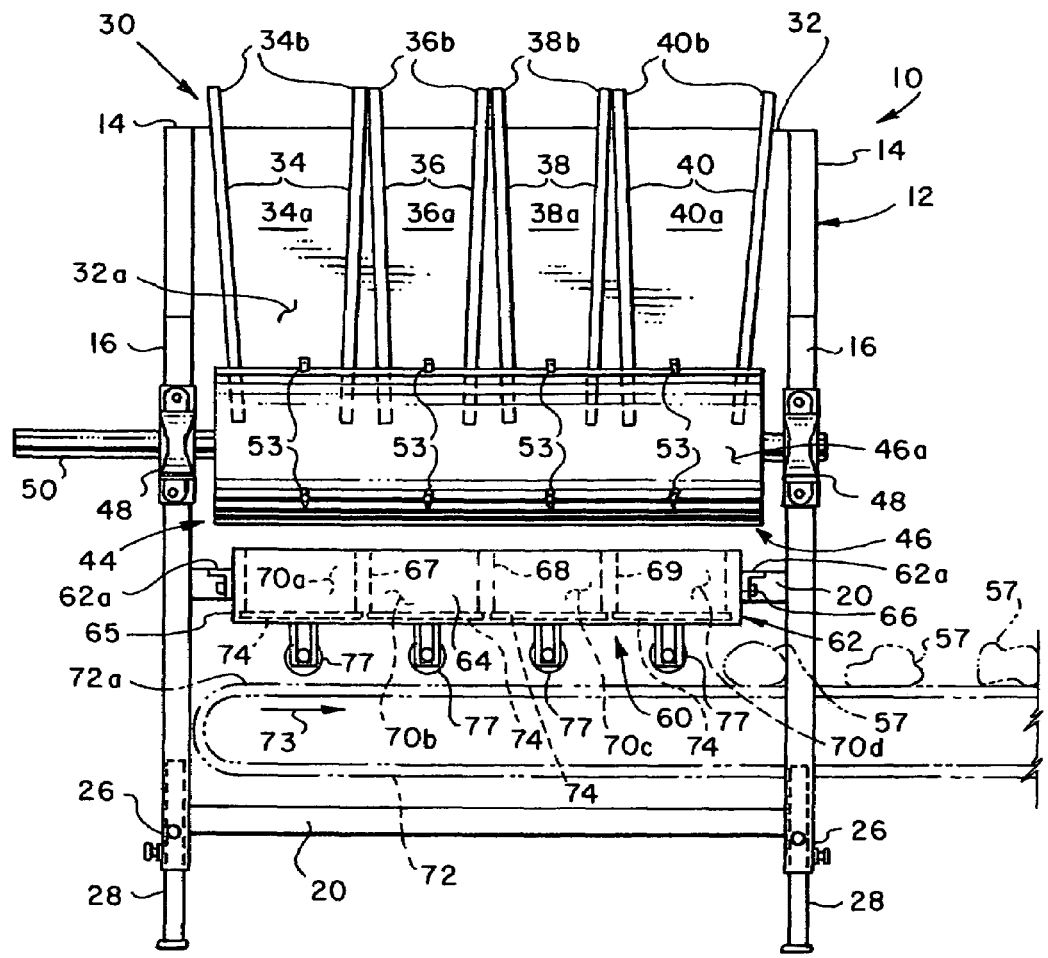
FIG. 3 is a front elevation view of the apparatus shown in FIGS. 1 and 2.

Referring to FIGS. 1, 2 and 3, there is illustrated an apparatus in accordance with the invention and generally designated by the numeral 10. The apparatus 10 includes a frame 12 characterized by two sets of spaced apart upstanding column members 14 and 16, which are interconnected by elongated brace members 18 and 20 and also by lateral brace members 22 and 24. The column members 14 and 16 may be configured to include, at their lower ends, height adjustment mechanism 26 interconnecting the column members with suitable adjustable feet 28.

Apparatus 10 includes a first article separation stage or unit, generally designated by the numeral 30, and characterized by a generally flat, rectangular support and article slide plate 32 supported between the column members 14 and 16 and disposed at an acute angle to the horizontal, preferably about 45°. Separation and conveyor unit 30 also includes spaced apart sets of upstanding guide plates 34, 36, 38 and 40, FIGS. 2 and 3, which are disposed upstanding from the surface 32a of slide plate 32 and are adjustable laterally to provide downwardly extending variable width and somewhat tapered channels 34a, 36a, 38a and 40a, respectively. For example, the plates 34 are preferably spaced apart farther at their upper ends 34b than at their lower ends 34c. The sets of plates 36, 38 and 40 may be laterally adjustably positioned with respect to each other to provide somewhat of a funneling action as articles are disposed on the plate 32 at its upper end 32b, and slide toward lower end 32c, see FIGS. 1 through 3.

Articles may be conveyed to the first separator unit or stage 30 by various means, not shown, including a conveyor or a suitable bulk dispensing apparatus. Separator plate 32 is preferably formed of very low friction stainless steel having a surface finish sufficient, together with its inclination to the horizontal, to provide unrestricted sliding movement of articles from the entrance portions of the sets of guide plates 34, 36, 38 and 40, which would be the upper ends 34*b*, 36*b*, 38*b* and 40*b* of the respective plates so that as articles slide down the separator plate 32, they tend to move singulated toward a second separator stage, generally designated by the numeral 44. Separator unit or stage 44 comprises a rotatable cylindrical drum or cylinder 46 mounted for rotation on suitable spaced apart bearings 48 by way of a central shaft 50 of the drum. Shaft 50 is operable to be drivenly connected to suitable motor means, not shown, for rotating drum 46 in a clockwise direction, that is in the direction of arrow 51, viewing FIG. 1.

Figure 4:
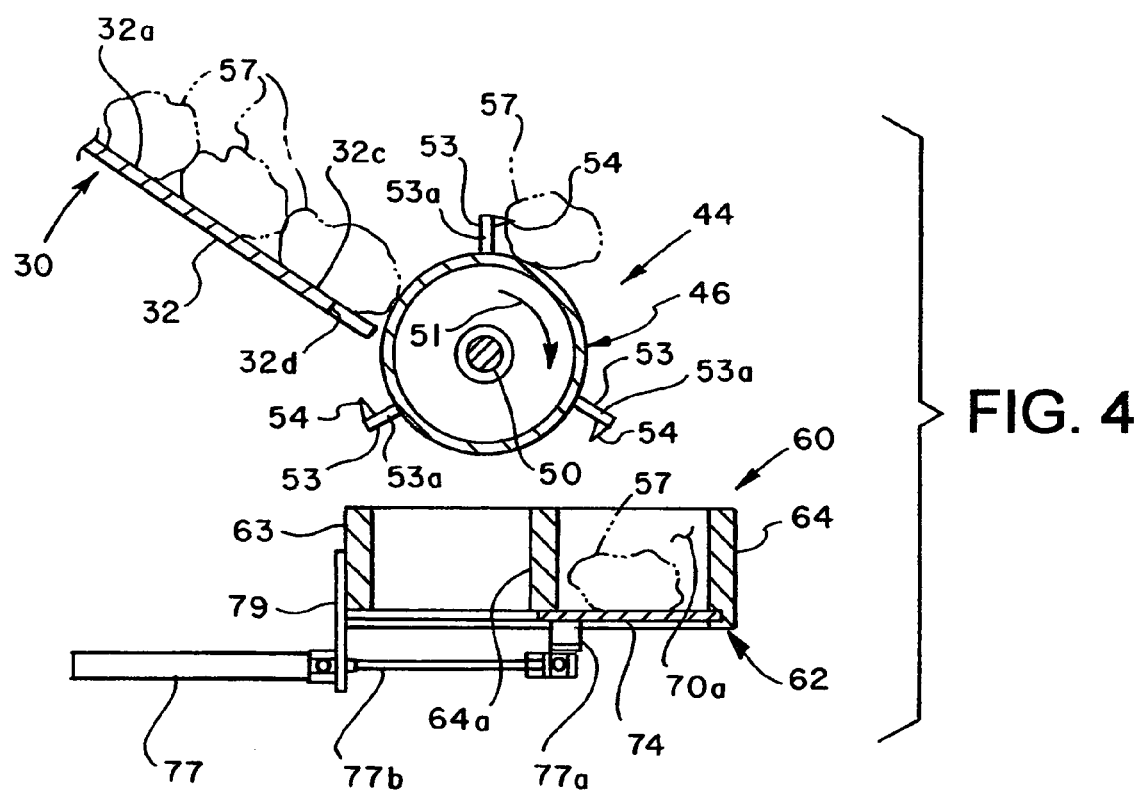
FIG. 4 is a detail section view in somewhat schematic form and taken generally along the line 4-4 of FIG. 2.

Viewing FIG. 4 also, drum 46 is provided with circumferentially and axially and equally spaced apart sets of article engaging members comprising radially projecting tines 53, each set including three tines equally spaced, as shown in FIG. 4, particularly, and projecting radially from a generally smooth cylindrical surface 46*a* of drum 46. Tines 53, each include respective hook portions 54 which project normal to the main body 53*a* of the tines themselves, as indicated in FIG. 4. Hook portions 54 are preferably tapered and of sufficient length such as to positively engage a pliable article, such as a poultry carcass, each indicated by numeral 57 in FIG. 4. Accordingly, as the drum 46 rotates in the direction of arrow 51, FIGS. 1 and 4, about the central longitudinal axis of the shaft 50, the drum engages an article, such as carcass 57, and conveys the carcass around to a position generally horizontal wherein gravity will release the carcass to be deposited into a receptacle or compartment comprising part of a third separation and singulation stage of the apparatus 10, and generally designated by the numeral 60. As shown in FIG. 4, the separator and conveyor plate 32 is provided with plural notches 32*d*, one shown, which provide clearance for the tines 53, 54 as the drum 46 rotates. A set of three circumferentially spaced tines 53, 54 is provided on drum or cylinder 46 generally centered with respect to the channels 34*a*, 36*a*, 38*a* and 40*a* provided by the respective sets of guide plates 34, 36, 38 and 40, as shown in FIGS. 2 and 3. The four respective sets of tines 53 are preferably aligned with each other in the same manner as indicated for the set of tines shown in FIG. 4.

Referring further to the drawing figures, the third separation and singulation unit or stage 60 is characterized by a generally rectangular elongated box-like frame or container 62 having spaced apart longitudinal sidewalls 63 and 64, a longitudinal intermediate wall 64*a*, FIG. 4, transverse end walls 65 and 66 and transverse intermediate partitions 67, 68 and 69, FIGS. 2 and 3, defining article receiving compartments 70*a*, 70*b*, 70*c* and 70*d*. Container or frame 62 is supported on frame 12 generally adjacent and below drum 46 by spaced apart brackets 62*a* connected to a frame member 20, FIGS. 2 and 3. Compartments 70*a*, 70*b*, 70*c* and 70*d* are aligned, generally, with each set of tines 53, as shown in the drawings. As the drum 46 rotates with articles 57 engaged with the tines 53, 54, the articles are deposited into the respective compartments 70*a*, 70*b*, 70*c* and 70*d* once the drum rotates to a position where a tine 53 is generally horizontal and the hook portion 54 is pointing downwardly, viewing FIG. 4. Accordingly, articles 57 will be released by gravity forces to fall into a compartment, such as the compartment 70*a*, viewing FIG. 4. As articles 57 descend down separator plate 32 guided by the sets of guide plates 34, 36, 38 and 40, the articles are separated for singulation by the rotatable drum 46 and its spaced apart sets of radially projecting tines 53 whereby the articles 57 are then deposited in the respective compartments 70*a*, 70*b*, 70*c* and 70*d* of the third separator unit or stage 60.

Viewing FIGS. 1 and 3, the apparatus 10 is typically positioned adjacent means for receiving separated and singulated articles which are disposed along a line, one after the other. By way of example only, such apparatus to be placed adjacent the apparatus 10 could comprise an endless conveyor belt 72, as illustrated in FIGS. 1 and 3, and operated to traverse in the direction of arrow 73, FIG. 3, with respect to the upper run 72*a* of the conveyor. Third separator stage 60 is provided with suitable closures associated with the frame 62 and comprising slidable gates or doors 74 forming bottom closures for the respective compartments 70*a*, 70*b*, 70*c* and 70*d*, FIGS. 3 and 4. Each of the gates or closures 74 is connected to a suitable actuator, such as a pneumatic piston and cylinder type actuator 77, see FIGS. 3 and 4. As shown in FIG. 4, by example, each actuator 77 is mounted on container or frame 62 by bracket means 79 and is connected to a closure 74 by a bracket 77*a* connected to a piston rod 77*b* of the respective actuator. Each closure 74 is suitably mounted on container or frame 62 for reciprocal sliding movement by its actuator 77. Thus, actuators 77 are operable to move the closures 74 from the positions shown in FIGS. 2 and 4 to alternate positions to allow an article 57 disposed on the closure and in a compartment defined in part by the respective closure to fall through the opening so created by movement of the closure and on to further means for handling the article, such as the conveyor 72.

By operating the closures 74 to move to "open" the bottom sides of the compartments 70*a*, 70*b*, 70*c* and 70*d* in timed relationship to each other, articles 57 are placed in a line in single file or seriatim and also suitably separated from each other on conveyor run 72*a*, for example, thanks to timing the movement of the closures 74. Timing the rate of rotation of drum 46 and the actuation of closures 74 may also determine the spacing of articles on conveyor 72. Should an article 57 tend to move with a closure 74 as it is transferred laterally from the position shown in FIG. 4 to an alternate position, partition or wall 64*a*, FIG. 4, defining in part the respective article receiving compartments, will engage the article to assure that it falls by gravity onto the conveyor 72. Upon actuation to release an article 57, a closure 74 is returned to the position shown in FIG. 4 promptly for receiving the next article to be conveyed thereto by the second separator and conveyor stage 44.

The construction and operation of the apparatus 10 is believed to be understandable to one of ordinary skill in the art based on the foregoing description. Conventional engineering materials may be used to fabricate the apparatus 10 in accordance with the requirements of the process industry utilizing the apparatus. Those skilled in the art will also recognize that the second separation and conveyor stage 44 comprising the drum 46 may take on various configurations. For example, the drum may be configured in other ways to allow a product or article to be adhered to the drum for conveyance from a point of reception from the first stage to a point for deposition to the third stage. The drum 46 might comprise radially projecting plates spaced apart one from the other or the drum could be replaced by a belt-like structure disposed around a sprocket turning on a shaft or a spoked rotary mechanism that will provide for an article to lie on the spokes but to be released by the force of gravity as the mechanism rotates to a position which would allow the article to be placed in the compartments of the third stage 60.

Those skilled in the art will also recognize that other articles may be conveyed, separated and single filed by the apparatus 10, that is, articles other than soft and pliable masses such as poultry carcasses or parts thereof. However, the apparatus 10 is particularly useful for conveying somewhat pliant, pierceable masses which tend to stick to each other and otherwise are relatively difficult to separate and singulate. Thanks to the apparatus 10, this longstanding problem has been overcome.

Although a preferred embodiment of the invention has been described in detail herein, those skilled in the art will also recognize that various substitutions and modifications may be made without departing from the scope and spirit of the appended claims.

What is claimed is:

1. Apparatus for separating and transferring articles seriatim comprising:
    a first separator unit for receiving separable articles generally contiguous with each other and for aligning said articles to be engaged by a second separator unit;
    a second separator unit engageable with said articles one after another for transferring said articles to a third separator unit; and
    a third separator unit operable to receive articles from said second separator unit and to deposit said articles on means whereby said articles are aligned with each other and spaced apart,
    wherein said third separator unit comprises a frame and means forming respective compartments each including movable closure members delimiting said compartments and being positioned for receiving articles from said second separator unit, said closure members being movable to release said articles from said third separator unit in timed relationship to means for further handling of said articles, respectively.

2. The apparatus set forth in claim 1 wherein:
    said first separator unit includes a slide plate for supporting said articles for movement under force of gravity toward said second separator unit.

3. The apparatus set forth in claim 2 including:
    guide means associated with said slide plate for guiding said articles as said articles move toward said second separator unit.

4. The apparatus set forth in claim 3 wherein:
    said guide means comprise spaced apart sets of guide plates disposed adjacent said slide plate and forming respective plural channels for guiding said articles for movement along said slide plate.

5. The apparatus set forth in claim 4 wherein:
    said guide plates are spaced apart from each other a distance greater at a first end than at a second end of said guide plates, respectively.

6. The apparatus set forth in claim 2 wherein:
    said second separator unit includes a rotary member for engaging articles disposed on said slide plate and for conveying said articles to said third separator unit.

7. The apparatus set forth in claim 6 wherein:
    said rotary member comprises a drum including circumferentially spaced article engaging members projecting radially from said drum and operable to engage said articles, one after another, as said drum rotates and to release said articles from engagement with said second separator unit by force of gravity.

8. The apparatus set forth in claim 7 wherein:
    said article engaging members comprise radially projecting tines operable to engage said articles and to move said articles to a position whereby said articles may be released from engagement with said tines under force of gravity.

9. The apparatus set forth in claim 8 wherein:
    said tines include laterally projecting hook portions for engaging said articles, respectively.

10. The apparatus set forth in claim 1 wherein:
    said third separator unit includes plural compartments spaced apart along the longitudinal extent of a drum forming at least part of said second separator unit, said compartments receiving articles conveyed thereto by rotation of said drum.

11. The apparatus set forth in claim 1 including:
    actuator means connected to respective ones of said closure members and operable to selectively move said closure members for releasing articles from said third separator unit for spacing said articles apart a predetermined distance and for placing said articles substantially singularly in a line with respect to each other.

12. Apparatus for separating and transferring articles comprising:
    a first separator unit comprising a surface disposed at an angle to the horizontal and operable for receiving separable articles and for aligning said articles to be engaged by a second separator unit;
    a second separator unit including a rotatable drum and members spaced apart thereon engageable with said articles one after another for transferring said articles to a third separator unit; and
    a third separator unit including means forming plural spaced apart side by side compartments operable to receive articles from said second separator unit and to deposit said articles on means whereby said articles are aligned with each other and spaced apart,
    wherein said compartments are delimited by respective movable closure members and said third separator unit includes actuator means connected to respective ones of said closure members and operable to selectively move said closure members for releasing articles from said third separator unit for spacing said articles apart a predetermined distance and for placing said articles substantially singularly in a line with respect to each other.

13. The apparatus set forth in claim 12 wherein:
    said first separator unit includes a slide plate defining said surface for supporting said articles for movement under force of gravity toward said second separator unit.

14. The apparatus set forth in claim 13 wherein:
    said guide means comprise spaced apart sets of guide plates disposed adjacent said slide plate and forming respective plural channels for guiding said articles for movement along said slide plate.

15. The apparatus set forth in claim 14 wherein: said guide plates of a set are spaced apart from each other a distance greater at a first end than at a second end of said guide plates, respectively.

16. The apparatus set forth in claim 12 wherein:
    said members on said drum project radially from said drum and are operable to engage said articles, one after another, as said drum rotates and to release said articles from engagement with said second separator unit substantially by force of gravity.

17. The apparatus set forth in claim 16 wherein:
    said members on said drum comprise radially projecting tines operable to engage said articles and to move said articles to a position whereby said articles may be released from engagement with said tines under force of gravity.

18. The apparatus set forth in claim 17 wherein:
    said tines include laterally projecting hook portions for engaging said articles respectively.

* * * * *